(12) United States Patent
Eiselt et al.

(10) Patent No.: US 6,827,643 B2
(45) Date of Patent: Dec. 7, 2004

(54) ELECTRICAL SWITCHGEAR COMPRISING A VENTILATION DEVICE AND VENTILATION DEVICE COMPRISING TWO VENTILATION ELEMENTS

(75) Inventors: Martin Eiselt, Grundau (DE); Gildo Mahn, Linsengericht (DE); Achim Milbich, Waghaeusel (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/472,586
(22) PCT Filed: Mar. 11, 2002
(86) PCT No.: PCT/DE02/00934
  § 371 (c)(1),
  (2), (4) Date: Sep. 22, 2003
(87) PCT Pub. No.: WO02/075885
  PCT Pub. Date: Sep. 26, 2002

(65) Prior Publication Data
US 2004/0097186 A1 May 20, 2004

(30) Foreign Application Priority Data
Mar. 20, 2001 (DE) .......................... 101 14 743

(51) Int. Cl.[7] ................................. H05K 7/20
(52) U.S. Cl. .................. 454/184; 174/17 VA; 361/678; 454/194
(58) Field of Search ................. 454/184, 194; 174/17 VA; 361/678

(56) References Cited

U.S. PATENT DOCUMENTS 3,301,168 A * 1/1967 Schindler et al. ........... 454/194
6,417,443 B1 * 7/2002 Smith ..................... 174/17 VA

FOREIGN PATENT DOCUMENTS

| DE | 28 39 998 A | * | 4/1980 | ................ 454/194 |
| DE | 29 19 434 A | * | 11/1980 | |
| DE | 30 13 756 C2 | | 10/1981 | |
| DE | 30 14 557 A1 | | 10/1981 | |
| DE | 91 02 513.3 | | 7/1991 | |
| FR | 2 579 032 | | 9/1986 | |
| GB | 2252671 A | * | 8/1992 | ........ H01H/33/575 |
| WO | WO 97/13264 | | 4/1997 | |

* cited by examiner

Primary Examiner—Harold Joyce
(74) Attorney, Agent, or Firm—Morrison & Foerster LLP.

(57) ABSTRACT

An electrical switchgear (ES) comprising at least one function module (FM, FM . . . ) having an encapsulated housing, and a decompression channel (DK) which is connected to the housing. Said decompression channel (DK) comprises a ventilation device (LV, LV . . . ) in at least one of its generated surfaces, said device having two wall-type ventilation elements (LE 1,2) which are successively arranged at a distance from each other and are provided with ventilation openings. One ventilation element (LE 1) is connected to the generated surface of the decompression channel (DK) in a fixed manner, and the other ventilation element (LE 2) can be moved in a guided manner against the fixed ventilation element (LE 1). The moveable ventilation element (LE 2) can be linearly displaced inside a guiding frame (FR) and the ventilation openings of the ventilation elements (LE 1,2) are staggered in relation to each other. The moveable ventilation element (LE 2) comprises spring-type catch elements (RE) with which engaging openings (EO 1,2) are associated in the guiding frame. Such switchgears are used in connection with energy supply and distribution.

3 Claims, 3 Drawing Sheets

ELECTRICAL SWITCHGEAR COMPRISING A VENTILATION DEVICE AND VENTILATION DEVICE COMPRISING TWO VENTILATION ELEMENTS

CLAIM FOR PRIORITY

This application claims priority to International Application No. PCT/DE02/00934 as published in the German language on Sep. 26, 2002, which claims the benefit of priority to German Application No. 10114743.0 which was filed in the German language on Mar. 20, 2001.

TECHNICAL FIELD OF THE INVENTION

The invention relates to an electrical switchgearand to a ventilation device having two ventilation elements.

BACKGROUND OF THE INVENTION

An electrical switchgear usually comprises a number of function modules which are separate from one another. Usually provided inside these function modules are individual function spaces. The function spaces may be, for example, switching compartments, cable terminal compartments or busbar compartments. The components contained in these function spaces, in particular the cable and terminal leads, carry high currents and consequently are continuously generating heat. This must be carried away from the interior of the housing. Often provided in the function modules for this purpose are ventilation openings, through which cold air which carries heat away from the components can flow in and finally leaves the function module again through venting openings. In this case, the cooling may be achieved by free convection or by forced convection, for example with a fan. The ventilation and venting openings in this case remain constantly open. In the event that a fault-induced are flashover can occur within the function module, it is possible, for example, for hot gases to escape from the plant through such openings and injure the plant personnel or cause other damage. On the other hand, a solution without ventilation openings would require the function modules to have a very large volume of their own. This would, however, be counter to the requirement for a compact and consequently space-saving and low-cost design of the function modules.

It is known, in the case of an arc flashover, and excess pressure thereby occurring in the function module, to close the ventilation openings mentioned mechanically. The ensures that the hot gases and the pressure surge produced by the arc flashover are kept within the interior of the plant. For this purpose, the ventilation openings may be closed in the case of excess pressure by two non-return valves successively arranged and connected by a linkage. In this case, the movable element is fixed in the open position during normal operation by a thread which can easily melt. In the case of an arc flashover, with the great generation of heat accompanying it, the thread is destroyed and the movable element swings under the influence of gravity and the pressure surge on the linkage guide against the fixed element and closes the latter—whereas the venting openings are formed as decompression flaps provided with air slits.

It is also known to close the ventilation openings of a switchgear in the event of excess pressure by hinged flaps. During normal operation, the flaps are held in the open position by spring components. The pressure surge arising when there is an arc flashover causes the flaps to be released from their securement and slam onto the ventilation slits. Fixing in the closed position is not envisaged.

SUMMARY OF THE INVENTION

The invention relates to an electrical switchgear comprising at least one function module having an encapsulated housing and comprising a decompression channel which is connected to the housing, the decompression channel having a ventilation device in at least one of its generated surfaces, the device having two wall-like ventilation elements which are successively arranged at a distance from each other and are provided with ventilation openings, one ventilation element being connected in a fixed manner to the generated surface of the decompression channel and the other ventilation element being movable in a guided manner against the fixed ventilation element.

The invention also relates to a ventilation device comprising two wall-like ventilation elements which are successively arranged at a distance from each other and are provided with ventilation openings, one ventilation element being connected in a fixed manner to a wall surface of the device to be ventilated and the other ventilation element being movable in a guided manner against the fixed ventilation element.

Simply stated, the invention sproposes a ventilation device which is as simple as possible, saves space and can be produced at low cost, comprising ventilation openings which close in the event of excess pressure, the ventilation openings remaining closed over an adequately long period of time.

In one embodiment of the invention, the movable ventilation element is movable linearly inside a guiding frame, by the ventilation openings of the ventilation elements being staggered in relation to one another and by the movable ventilation element having spring-like catch elements with which engaging openings in the guiding frame are associated.

The ventilation device according to the invention has the advantage of a space-saving and additionally simple-to-produce construction. For example, the ventilation elements may comprise simply shaped metal sheets. During normal operation, the heated air can flow out of the plant through the ventilation openings arranged in the ventilation elements.

In the event of an arc with a subsequent excess pressure peak, the staggered ventilation openings are closed. In this regard, the movable ventilation element is moved against the fixed ventilation element and fixed there. On account of the staggered arrangement of the ventilation openings, they are closed in a sealed manner. The closing of the ventilation openings is initiated by the pressure peak itself, so that no further measures have to be taken for detecting the arc or for controlling the closure.

Since one ventilation element is movably configured, the number of parts which are movable, and consequently subject to wear, is reduced to a minimum. Consequently, low maintenance expenditure is incurred. The spring-like catch elements on the movable ventilation element serve, on the one hand, for the easily releasable fixing of the movable ventilation element in the open position. On the other hand, they arrest the movable element in the closed position. This measure achieves the effect that, even after the first pressure peak has subsided, the ventilation openings continue to remain securely closed. In this way, hot gases which are still included in the decompression channel even after the pressure peak cannot escape from the plant. The design with the spring-like catch elements makes it possible that, after a fault in the plant, the movable ventilation elements can be reset into their open position without great expenditure. No special tools are required for this purpose.

An advantageous embodiment of the invention includes the slidable guiding pins provided for guiding the movable ventilation element in guiding grooves.

This design permits secure guidance of the movable ventilation element and prevents canting of the ventilation elements.

A further advantageous embodiment of the invention provides that the ventilation openings are formed as slits.

The configuration of the ventilation openings in the form of slits can be easily realized in production engineering terms.

Ventilation devices such as those which, according to the invention, are integrated in the decompression channel of a switchgear may also be used if appropriate for other devices in which it is in certain cases a concern to keep pressure peaks or high temperatures within the device.

BRIEF DESCRIPTION OF THE DRAWINGS

Exemplary embodiments of the invention are represented in the drawing, in which.

Figure 1:
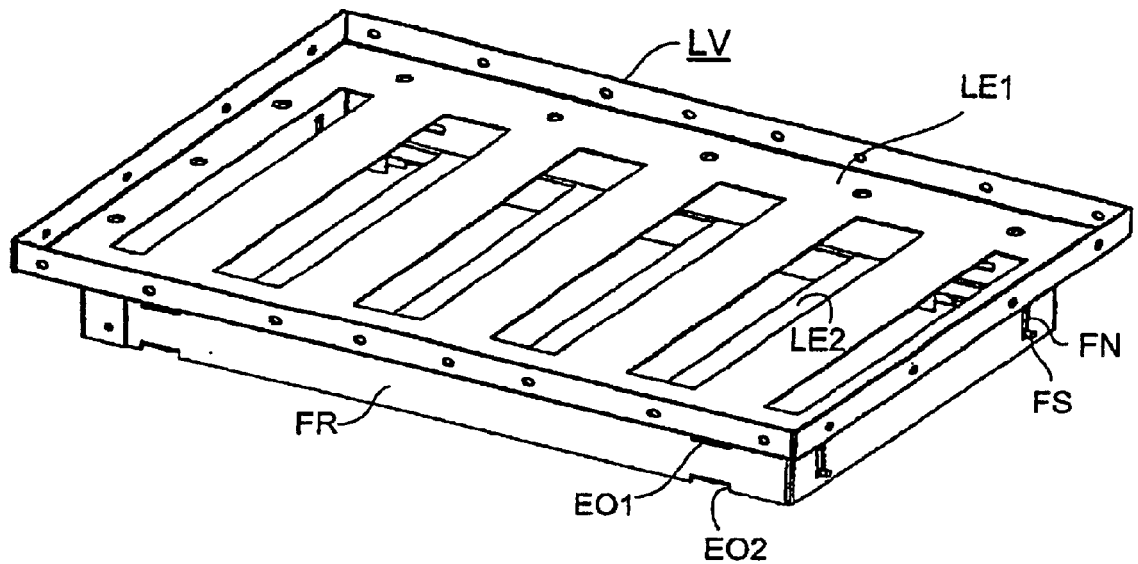
FIG. 1 shows a three-dimensional view of a first embodiment of the ventilation device.

For clarity, in the figures, the devices that are directly functionally linked to one another are respectively provided in only one instance with reference numerals.

DETAILED DESCRIPTION OF THE INVENTION

FIG. 1 shows a first embodiment of the ventilation device LV, on which a guiding frame FR which has guiding grooves FN on its end faces and engaging openings EO 1, 2 on its longitudinal sides is located on a stationary ventilation element LE 1. The movable ventilation element LE 2 with the undesignated ventilation slits, which are staggered with respect to the fixed ventilation element LE 1, can also be seen. The entire ventilation device LV is installed into the plant in such a way that the side with the movable ventilation element LE 2 faces the interior of the plant. If excess pressure then occurs within the switchgear, the movable ventilation element LE 2 is forced by the pressure surge against the fixed ventilation element LE 1. The staggered arrangement of the ventilation slits has the effect that the plant is closed in this way.

Figure 2:
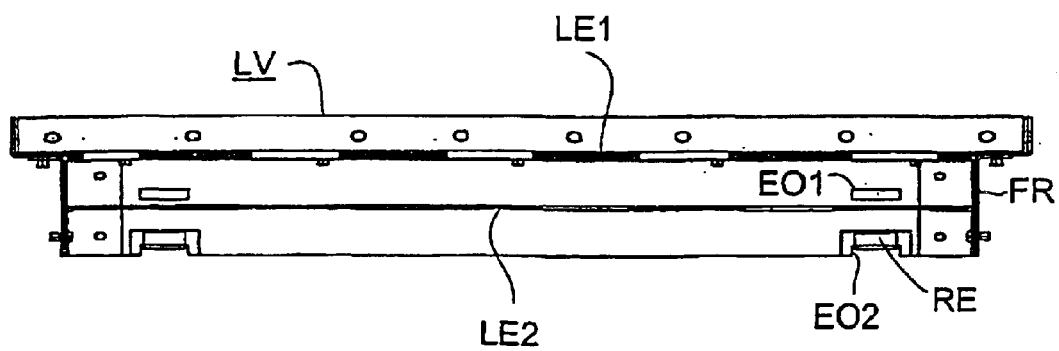
FIG. 2 shows a side view of the ventilation device according to FIG. 1.

In FIG. 2, apart from the fixed ventilation element LE 1 and the movable ventilation element LE 2, the engaging openings EO 1, 2 in the guiding frame FR can be seen. These provide the catch elements RE with points of engagement, so that the movable ventilation element LE 2 is positionally fixed on the fixed ventilation element LE 1 even after pressure has subsided. During normal operation, the catch elements RE lie in the engaging openings EO 2, whereby the movable ventilation element LE 2 is positionally fixed in the open position.

Figure 4:
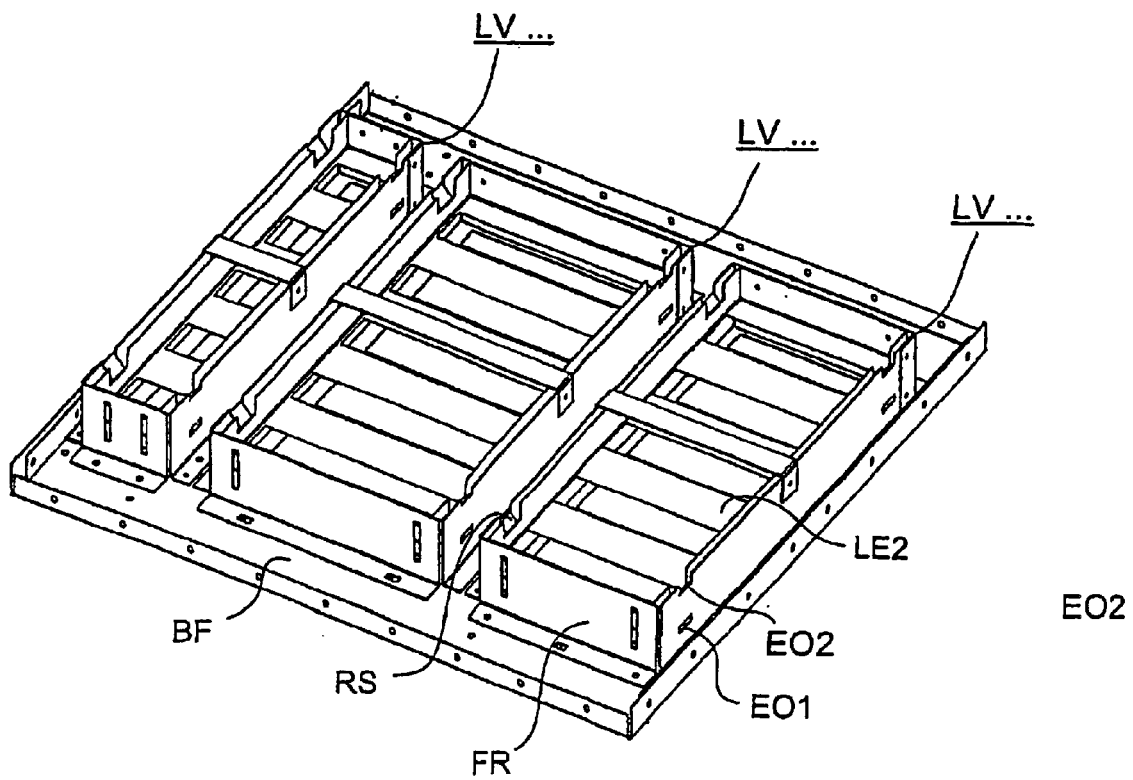
FIG. 4 shows a three-dimensional view of a second embodiment of the ventilation device.

This is important in particular when the ventilation device LV is installed in the region of a lower bounding surface of the electrical switchgear, in order to close the latter in the downward direction (see also FIG. 4).

After an upward movement of the movable ventilation element LE 2, the catch elements RE engage in the engaging openings EO 1 and thereby fix the movable ventilation element LE 2 in its closed position.

Figure 3:
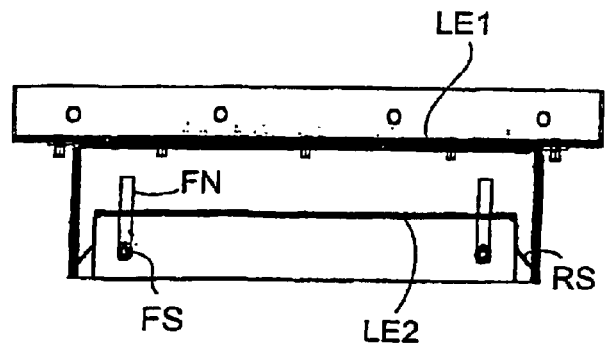
FIG. 3 shows a front view of the ventilation device according to FIG. 1.

In FIG. 3, the guiding grooves FN, in which the guiding pins FS of the movable ventilation element LE 2 are slidingly guided, can be seen. The catch elements RS of the movable ventilation element LE 2, which serve for fixing the position of the movable ventilation element LE 2 in its respective position with respect to the fixed ventilation element LE 1, can also be seen.

Figure 5:
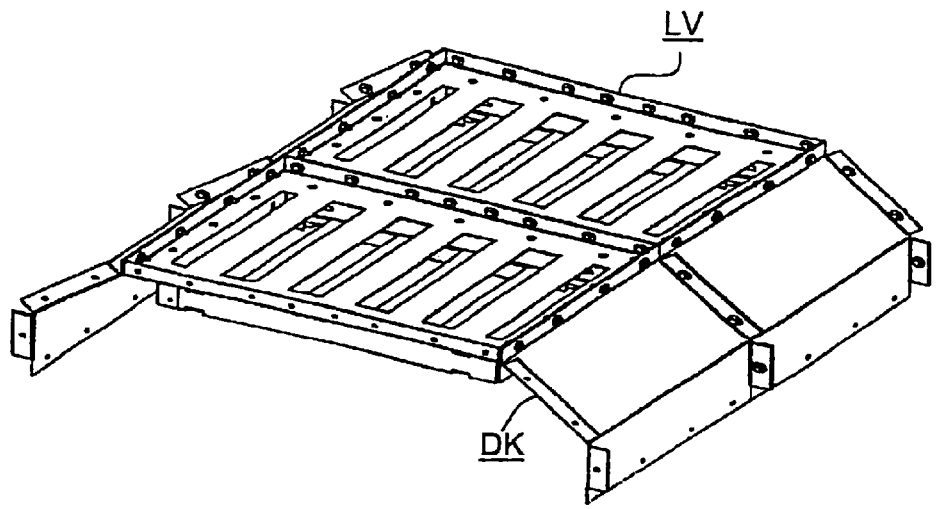
FIG. 5 shows a three-dimensional view of a decompression channel with the ventilation device according to FIG. 1.

FIG. 4 shows a possible arrangement of a number of ventilation devices LV, LV . . . on a common fastening surface BF, which may be realized for example as the lower bounding surface of a decompression channel DK (FIG. 5). In this case, the ventilation devices LV . . . may be of different sizes.

This arrangement is advantageous if a number of function spaces are to be connected to the decompression channel by their own ventilation devices in each case.

It can be seen that, in the normal operating case, the catch element RE of the movable ventilation element LE 2 keeps the movable ventilation element LE 2 in the open position by resting on the engaging opening EO 2 of the guiding frame FR. The spring action of the catch element RE is dimensioned such that, in the event of excess pressure in the switchgear, the movable ventilation element LE 2 can be moved into the closed position and is positionally fixed in the closed position by the catch elements RE engaging in the engaging openings EO 1 in the guiding frame FR.

In FIG. 5, the installation of the described ventilation device LV according to FIG. 1 in the region of the roof surface DF of the decompression channel DK is represented by way of example.

Figure 6:
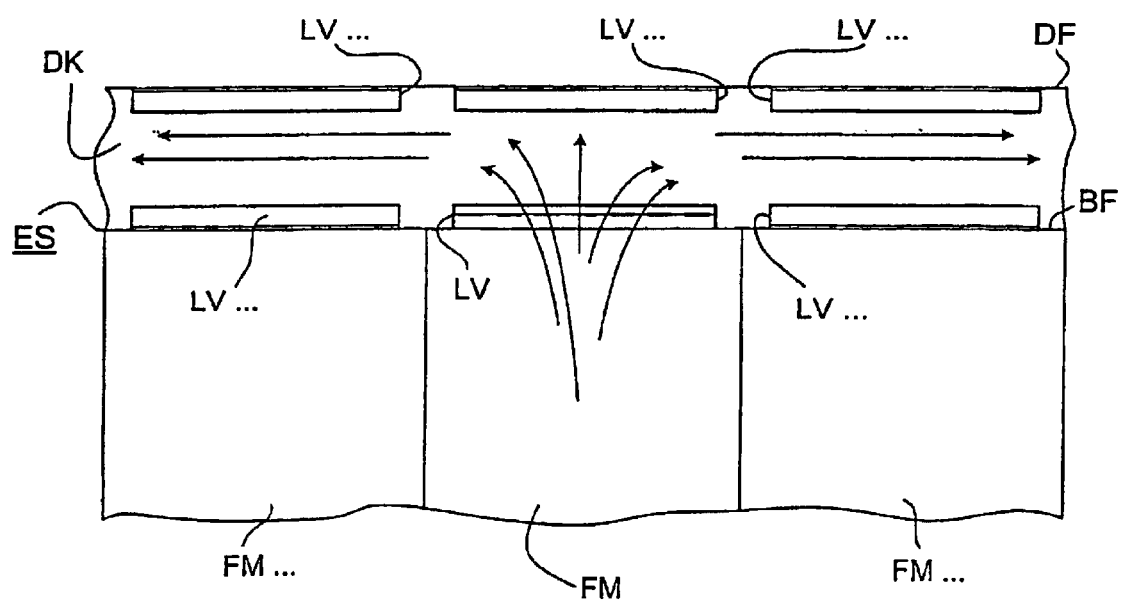
FIG. 6 shows a schematic view of a switchgear with one of the ventilation devices according to the invention as shown in FIG. 1 or 4.

FIG. 6 schematically shows the way in which the novel ventilation devices LV, LV . . . are associated with an electrical switchgear ES. The upper part of adjacent function modules FM, FM . . . can be seen, each function module FM, FM . . . being bounded in the upper region by its own ventilation device LV, LV. The function modules FM, FM . . . have a common decompression channel DK associated therewith in such a way that its bottom surface BF is predominantly formed by the fastening surface BF with the ventilation devices LV. In addition, the decompression channel DK has in the region of its roof surface DF its own ventilation devices LV., if appropriate of the same type of design.

If a fault then occurs in the function module FM with arc flashover, the ventilation device LV arranged over it is opened—as a result of the excess pressure. The hot gases propagate through the opened ventilation device LV into the decompression channel DK along the arrows.

On account of the high pressure, the other ventilation devices LV . . . close and consequently prevent the pressure surge and hot gases from being able to penetrate, on the one hand, into the other function modules FM . . . and, on the other hand, into the space surrounding the switchgear. As can be seen, the installation of these ventilation devices LV is both possible location-independently in switchgears and other equipment and can also be arranged position-independently in their roof surfaces and other bounding surfaces.

What is claimed is:

1. An electrical switchgear comprising:

at least one function module having an encapsulated housing; and a decompression channel which is connected to the housing, the decompression channel having a ventilation device in at least one of its generated surfaces, said ventilation device having two wall-like ventilation elements which are successively arranged at a distance from each other and are provided with ventilation openings, one ventilation element being connected in a fixed manner to one of the generated surfaces of the decompression channel and the other ventilation element being movable in a guided manner against the fixed ventilation element wherein the movable ventilation element is movable linearly inside a guiding frame, the ventilation openings of the ventilation elements are staggered in relation to one another, and the movable ventilation element has spring-like catch elements with which engaging openings in the guiding frame are associated.

2. The electrical switchgear as claimed in claim 1, wherein slidable guiding pins are provided for guiding the movable ventilation element in guiding grooves.

3. The electrical switchgear as claimed in claim 1, wherein the ventilation openings are formed as slits.

* * * * *